United States Patent
Lacy et al.

(10) Patent No.: US 10,286,995 B2
(45) Date of Patent: May 14, 2019

(54) AIRCRAFT LANDING GEAR

(71) Applicant: SAFRAN LANDING SYSTEMS UK LTD, Gloucester (GB)

(72) Inventors: Stuart Lacy, Cheltenham (GB); Geoff Cumner, Cheltenham (GB); Peter Michaelides, Cheltenham (GB)

(73) Assignee: SAFRAN LANDING SYSTEMS UK LTD, Gloucester (GB)

( * ) Notice: Subject to any disclaimer, the term of this patent is extended or adjusted under 35 U.S.C. 154(b) by 160 days.

(21) Appl. No.: 14/388,489

(22) PCT Filed: Mar. 21, 2013

(86) PCT No.: PCT/GB2013/050739
§ 371 (c)(1),
(2) Date: Sep. 26, 2014

(87) PCT Pub. No.: WO2013/144589
PCT Pub. Date: Oct. 3, 2013

(65) Prior Publication Data
US 2015/0053816 A1 Feb. 26, 2015

(30) Foreign Application Priority Data
Mar. 28, 2012 (GB) .................................. 1205489.6

(51) Int. Cl.
*B64C 25/00* (2006.01)
*B64C 1/40* (2006.01)

(52) U.S. Cl.
CPC .............. *B64C 1/40* (2013.01); *B64C 25/001* (2013.01); *B64C 2025/003* (2013.01); *B64C 2025/006* (2013.01)

(58) Field of Classification Search
CPC ................ B64C 2025/003; B64C 1/40; B64C 2025/006
USPC ....................... 244/1 N, 100 R, 102 A, 102 R
See application file for complete search history.

(56) References Cited

U.S. PATENT DOCUMENTS

| | | | |
|---|---|---|---|
| 2,719,016 A * | 9/1955 | Wicks ........................ | 244/102 R |
| 6,619,587 B1 * | 9/2003 | Chow et al. .............. | 244/100 R |
| 6,786,451 B2 * | 9/2004 | Courtois et al. .......... | 244/102 R |
| 7,954,757 B2 * | 6/2011 | Moe et al. ................. | 244/100 A |
| 8,256,702 B2 * | 9/2012 | Piet et al. ...................... | 244/1 N |
| 8,371,524 B2 * | 2/2013 | Chow et al. .............. | 244/102 A |
| 8,490,914 B2 * | 7/2013 | Chow et al. .................. | 244/1 N |

(Continued)

FOREIGN PATENT DOCUMENTS

| CN | 101279645 | 10/2008 |
|---|---|---|
| CN | 101668680 | 3/2010 |

(Continued)

OTHER PUBLICATIONS

International Search Report for PCT/GB2013/050739 dated May 29, 2013.

(Continued)

*Primary Examiner* — Richard R. Green
*Assistant Examiner* — Michael A. Fabula
(74) *Attorney, Agent, or Firm* — RatnerPrestia

(57) ABSTRACT

An aircraft landing gear which includes a noise-inducing region and a cover. The cover comprises a cover portion arranged to enclose the noise-inducing region to inhibit an airflow negotiating the noise-inducing region when the landing gear is in use.

13 Claims, 4 Drawing Sheets

(56) References Cited

U.S. PATENT DOCUMENTS

| | | | |
|---|---|---|---|
| 8,668,164 B2* | 3/2014 | Seror Goguet | B64C 7/00 244/1 N |
| 2003/0102406 A1* | 6/2003 | Chow | B64C 7/00 244/100 R |
| 2003/0164423 A1* | 9/2003 | Courtois et al. | 244/102 R |
| 2006/0102775 A1* | 5/2006 | Chow | B64C 7/00 244/1 N |
| 2007/0108344 A1* | 5/2007 | Wood | 244/102 R |
| 2008/0142634 A1* | 6/2008 | Moe et al. | 244/1 N |
| 2009/0078821 A1* | 3/2009 | Chow | B64C 7/00 244/1 N |
| 2009/0176078 A1* | 7/2009 | Seror et al. | 428/218 |
| 2010/0012778 A1* | 1/2010 | Chow et al. | 244/1 N |
| 2010/0108805 A1* | 5/2010 | Piet | B64C 25/16 244/1 N |
| 2010/0155529 A1* | 6/2010 | Chow et al. | 244/1 N |
| 2014/0131514 A1* | 5/2014 | Cook et al. | 244/100 R |

FOREIGN PATENT DOCUMENTS

| | | |
|---|---|---|
| EP | 1340676 | 9/2003 |
| EP | 1977969 | 10/2008 |
| WO | 0104003 | 1/2001 |

OTHER PUBLICATIONS

International Preliminary Report on Patentability for PCT/GB2013/050739 dated Jun. 11, 2014.
Response to Written Opinion for PCT/GB2013/050739 dated Dec. 11, 2013.
Chinese Office Action for Application No. 201380010424.X dated Jul. 1, 2015.

\* cited by examiner

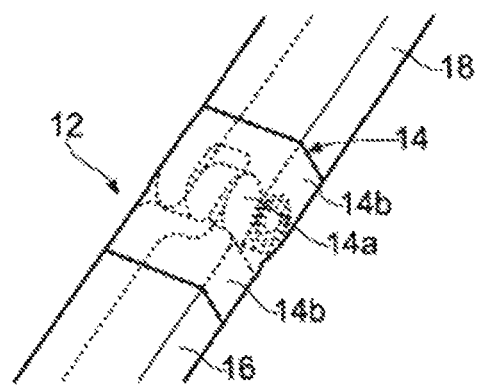
FIG. 4
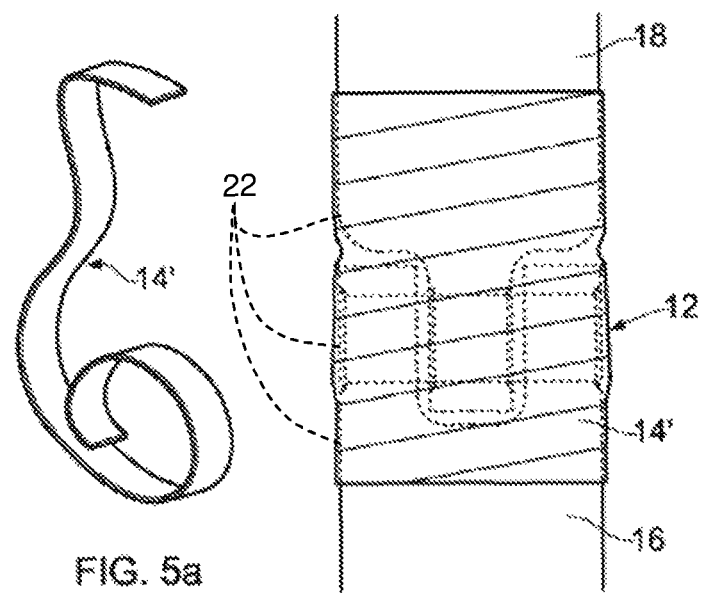
FIG. 5a
FIG. 5b

AIRCRAFT LANDING GEAR

This application is a U.S. National Phase application of PCT International Application No. PCT/GB2013/050739, filed Mar. 21, 2013, which claims the benefit of GB 1205489.6, filed Mar. 28, 2012, both of which are incorporated herein by reference.

BACKGROUND

An aircraft can generate considerable noise during a landing approach. A significant portion of this noise is attributable to air flowing around the deployed landing gear. Although the aircraft may be travelling at around 80 m/s during the landing sequence, the localised airflow around a noise-inducing component or region of the landing gear may reach speeds of around 300 m/s, which can result in considerable noise. This is known in the art, and will be referred to herein, as aeroacoustic noise. Aeroacoustic noise is particularly undesirable because of the fact that airports are often located close to cities, or other densely populated areas.

Attempts have been made to address aeroacoustic noise problems. For example, it is known to provide an aircraft landing gear with fairings. A fairing is a generally rigid structure, usually made from metal or composite materials, arranged to shield a noise-inducing region of an aircraft landing gear from airflow during landing. However, the present inventors have identified that known noise reducing devices, such as fairings, can undesirably increase the total envelope and/or weight of the landing gear and/or may affect articulation of the landing gear for stowage.

SUMMARY

In accordance with a first aspect of the present invention, there is provided an aircraft landing gear including a noise-inducing region and a cover comprising a cover portion arranged to substantially enclose the noise-inducing region to inhibit an airflow negotiating the noise-inducing region when the landing gear is in use. Thus, the cover portion substantially encloses the noise-inducing region, which inhibits airflow passing over, or through, the noise-inducing region, thereby reducing aeroacoustic noise.

The cover portion may be adjacent to the noise-inducing region; for example, the cover portion may extend around the noise-inducing region in close proximity to outer surface(s) of the noise-inducing region. In some embodiments the cover or cover portion may be tightly fitted to a peripheral surface or surfaces of the noise-inducing region. One or more of these features may result in the cover or cover portion not adversely affecting the envelope of the landing gear and/or not adversely affecting the articulation of the landing gear for stowage.

The cover portion may fully enclose the noise-inducing region. This may increase the ability of the cover portion to inhibit airflow negotiating the noise-inducing region when the landing gear is in use and/or may enable the cover portion to inhibit such airflows from numerous directions, such as crosswinds.

A substantial part of the cover portion may be close or adjacent to the noise-inducing region; for example, more than half of the cover portion may be adjacent to the noise-inducing region. It is preferred that more than 75% of the cover portion is adjacent to the noise-inducing region and more preferably at least 95%. Where the cover portion is adjacent to the noise-inducing region, it is less likely to adversely affect the envelope of the landing gear.

The cover portion may be arranged to enclose just a single noise-inducing region.

The landing gear may include a first component movably coupled to a second component via a coupling region, the coupling region comprising the noise-inducing region. The cover portion may comprise a flexible material arranged to permit movement of the first component relative to the second component.

The cover may enclose no more than one coupling region. This may reduce the likelihood of the cover adversely affecting the articulation of the landing gear for stowage.

The coupling region may comprise a pin joint.

The cover portion may be arranged to prevent the airflow passing through it.

The cover may include a coupling portion arranged for attachment to one or more components of the landing gear to maintain the cover portion in position. The coupling portion may be arranged to removably attach the cover to at least some of the components. In some embodiments the cover portion may be arranged to bond the cover to the at least some of the components.

At least half of the coupling portion may be adjacent to the one or more components.

The cover may include one or more openings arranged to permit access to the noise-inducing region.

The cover portion may comprise at least part of a sleeve or sock.

The cover portion may comprise at least part of an elongate strip of material wound around the noise-inducing region.

According to a second aspect of the present invention, there is provided a cover specially adapted for use with an aircraft landing gear according to the first aspect.

According to a third aspect of the present invention, there is provided a method of reducing noise created by an aircraft landing gear in use, the method comprising the steps of: providing an aircraft landing gear according to the first aspect including a noise-inducing region; and enclosing the noise-inducing region with a cover portion of a cover to inhibit an airflow negotiating the noise-inducing region when the landing gear is in use.

Features relating to the first aspect may apply equally to the third aspect.

The step of at least partially enclosing may comprise sliding a sleeve over the noise-inducing region to form the cover portion.

The step of at least partially enclosing may comprise winding a wrap around the noise-inducing region to form the cover portion.

BRIEF DESCRIPTION OF THE DRAWINGS

By way of example only, certain embodiments of the invention will now be described by referenced of the accompanying drawings, in which:

FIG. 4 is a detailed view of a noise-inducing region of the landing gear of FIG. 3 provided with a noise reducing cover;
FIG. 5a is a schematic diagram of a noise reducing wrap for an aircraft landing gear according to an embodiment of the present invention;
and FIG. 5b is a schematic diagram of an aircraft landing gear according to a further embodiment of the present invention, provided with the noise reducing wrap of FIG. 5a.

DETAILED DESCRIPTION

Figure 1:
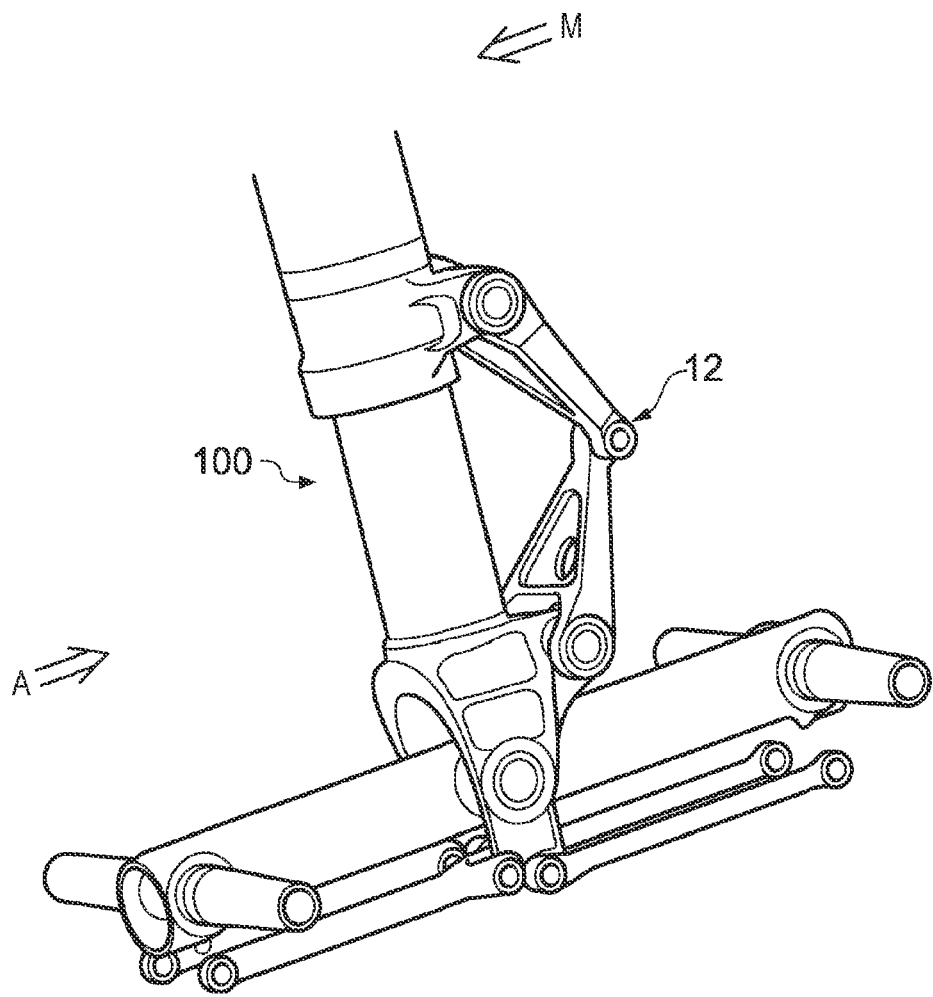
FIG. 1 is a schematic diagram of a prior art landing gear.

FIG. 1 shows a prior art landing gear 100. The landing gear 100 includes a noise-inducing region 12 in the form of a pin joint of a torque link. The landing gear 100 is shown in a deployed configuration, suitable for take-off and landing.

Due to the motion of the aircraft to which the landing gear 100 is coupled, the landing gear 100 generally moves in the direction of arrow M, which will be referred to as the landing gear motion direction M. Consequently, airflow moves relative to the landing gear 100 in the direction of arrow A, which will be referred to as airflow A. Airflow A can be considered to be a primary or resultant airflow from the forward and vertical velocity of the aircraft and will usually also include a cross wind component.

Figure 2:
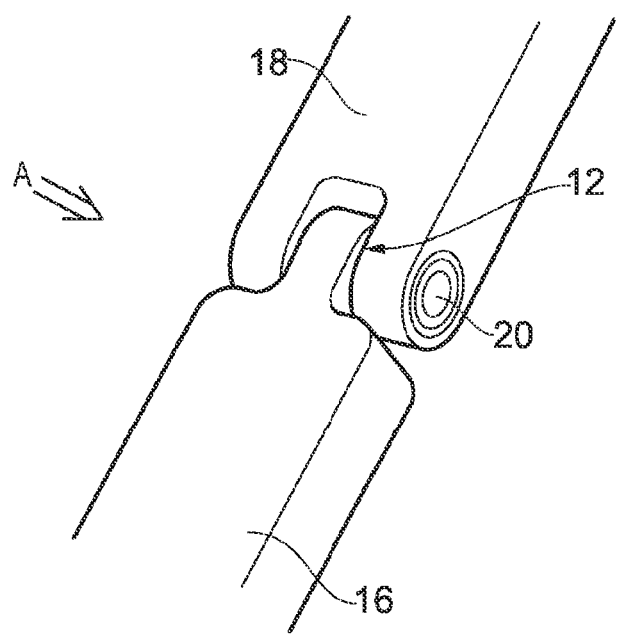
FIG. 2 is a detailed view of a noise-inducing region of a prior art landing gear.

Referring to FIG. 2, the pin joint 12 is shown in more detail. The pin joint 12 is defined by a first component 16 pivotally coupled to a second component 18 via a pivot pin 20. These components together define a relatively complex geometry. Aeroacoustic noise is generated as the airflow A negotiates the complex geometry of the pin joint 12.

Figure 3:
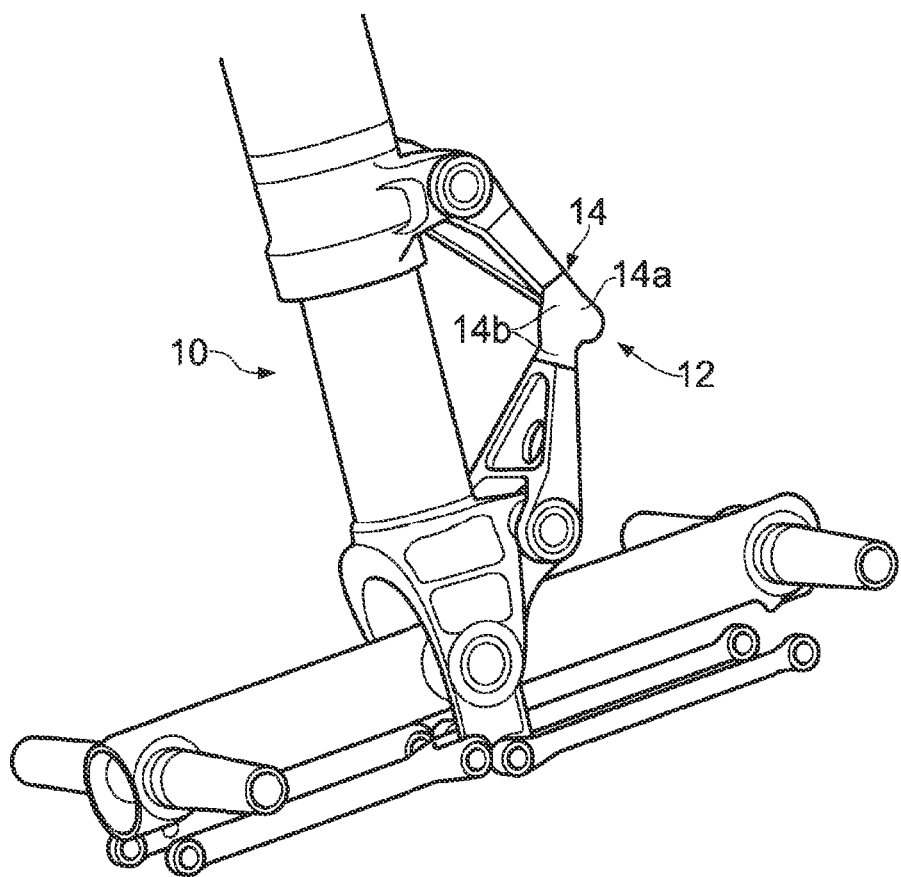
FIG. 3 is a schematic diagram of an aircraft landing gear according to an embodiment of the present invention.

Referring to FIGS. 3 and 4, an aircraft landing gear 10 according to an embodiment of the present invention is shown. The landing gear 10 is identical or similar to the landing gear 100 shown in FIG. 1, except that the landing gear 10 according to the illustrated embodiment of the present invention includes a cover 14.

The cover 14 comprises a cover portion 14a arranged to tightly enclose, or envelop, the pin joint 12 to inhibit the airflow A negotiating the pin joint 12 when the landing gear 10 is in use. Put another way, the cover 14 is tightly wrapped around the pin joint 12. The cover portion 14a therefore inhibits the airflow A passing over, or through, the noise-inducing pin joint 12, thereby reducing aeroacoustic noise. The term "inhibit" is used to mean prevent or disrupt.

The cover portion 14a encloses the pin joint 12 i.e. extends fully around it. This may increase the ability of the cover portion 14a to inhibit airflow A negotiating the noise-inducing pin joint 12 when the landing gear 10 is in use and/or may enable the cover portion 14a to inhibit crosswind components.

Due to the tight enclosure, the cover portion 14a is adjacent to the pin joint 12; for example, the cover portion 14a may extend around the pin joint 12 in close proximity to outer surface(s) of the pin joint 12. This may result in the cover portion 14a not adversely affecting the envelope of the landing gear 10 and/or not adversely affecting the articulation of the landing gear 10 for stowage.

A substantial part of the cover portion 14a may be adjacent to the pin joint 12; for example, more than half of the cover portion 14a may be adjacent to the pin joint 12. It is preferred that more than 75% of the cover portion 14a is adjacent to the pin joint 12 and more preferably at least 95%. Where the cover portion 14a is adjacent to the noise-inducing region 12, it is less likely to adversely affect the envelope of the landing gear 10.

As will be appreciated, a noise-inducing region may have one or more outer peripheral surfaces, in addition to inwardly extending surfaces or cavities and in such cases the cover or cover portion may just be adjacent to the outer peripheral surfaces, this being sufficient to provide a low profile cover.

The cover 14 and/or cover portion 14a of embodiments of the invention may be formed of any suitable material. In some embodiments the cover 14 may be formed of a natural material or synthetic fabric, which may or may not be impermeable to air. In some embodiments the cover 14 and/or cover portion 14a may be formed of a flexible and/or lightweight material, such as foam or fleece. In some embodiments the cover 14 and/or cover portion 14a may comprise a tightly woven mesh, or multiple layers of mesh, arranged to inhibit the airflow A.

The cover portion 14a may in some embodiments be arranged to prevent the airflow A passing through it; for example, the cover portion 14a may comprise rubber. In other embodiments the cover portion 14a may be permeable to the airflow A, but arranged to hinder and/or create turbulence so as to reduce aeroacoustic noise; for example, as referred to above, the cover portion 14a may comprise a mesh material.

The cover 14 may include one or more coupling portions 14b arranged for attachment to components 16, 18 of the landing gear 10 to maintain the cover portion 14a in position. In the illustrated embodiment the coupling portions 14b are the edge regions of the cover 14. However, any suitable coupling portion(s) may be provided. Where one or more coupling portions are provided, it is preferred that the majority of the coupling portions are adjacent to the one or more components 16, 18 to which they attach. Coupling portions 14b which are adjacent to the one or more components 16, 18 are less likely to adversely affect the envelope of the landing gear 10.

The cover 14 may include one or more openings (not shown) arranged to permit access to the noise-inducing region; for example, the openings may be arranged to accommodate grease nipples and the like.

The cover 14 illustrated in FIGS. 3 and 4 is in the form of an elastic sleeve which may be stretched in a radial manner to be positioned around the noise-inducing pin joint 12. The cover 14 resiliently grips to the pint joint 12 and first and second components 16, 18 to remain in place at the noise-inducing region 12. Thus, the cover 14 according to embodiments of the invention may fit tightly around the noise-inducing region 12. As will be appreciated, the coupling portions 14b mean that the cover portion 14a need not couple to the noise-inducing pint joint 12.

Referring to FIGS. 5a and 5b, a cover 14' according to a further embodiment of the present invention is shown, in the form of a flexible wrap i.e. an elongate strip which may be wound around the noise-inducing pin joint 12. The outer surfaces of the components forming the pin joint 12 form side walls 22. Once the wrap 14' has been wound around the noise-inducing region so as to enclose the noise-inducing region 12, the wrap inhibits airflow A negotiating the complex geometry of the noise-inducing region and as such reduces aeroacoustic noise. In some embodiments the wrap 14' may have its end secured using quick release catches for easy removal. Alternatively, an adhesive may be used to secure the wrap in place.

While in the illustrated embodiments, the cover portion is provided so as to enclose a pin joint 12, in other embodiments the cover portion may be provided so as to enclose any noise-inducing region, such as a groove or protrusion. As will be apparent to the skilled person, an aircraft landing gear according to embodiments of the present invention may include numerous noise-inducing regions, which in any embodiments of the present invention may comprise at least some of one or more components. In some embodiments a noise-inducing region may be defined by a coupling region between a first component which is movably coupled to a second component, examples being pin joints and cardan joints. In cases where the cover 14, 14' is provided so as to enclose a noise-inducing coupling region between two parts, it is advantageous that the cover is flexible, in some cases elastic, and in some embodiments lightweight, so as not to inhibit the kinematics of the landing gear or adversely affect the airframe by requiring more space for landing gear stowage. In other embodiments a noise-inducing region may be in the form of a recess, protrusion or the like. In some embodiments it is preferred that the cover or cover portion encloses a single noise-inducing region, for example a single pin joint 12 or the like.

A cover according to embodiments of the present invention is advantageous over known fairings and the like because is it able to reduce aeroacoustic noise, even in strong cross winds, without adversely affecting the envelope or articulation of the landing gear.

A method of reducing noise created by an aircraft landing gear in use, i.e. during take off or landing, comprises the steps of: providing an aircraft landing gear including a noise-inducing region; and enclosing the noise-inducing region with a cover portion of a cover to inhibit an airflow negotiating the noise-inducing region when the landing gear is in use.

The step of at least partially enclosing may comprise sliding a sleeve over the noise-inducing region to form the cover portion.

The step of at least partially enclosing may comprise winding a wrap around the noise-inducing region to form the cover portion.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" can mean "including" or "consisting of" and therefore does not exclude the presence of elements or steps other than those listed in any claim or the specification as a whole. The word "coupled" can mean "attached" or "connected". The singular reference of an element does not exclude the plural reference of such elements and vice-versa. In an apparatus claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear including:
a first component;
a second component;
a coupling region movably coupling the first component to the second component, the coupling region defining one or more side walls extending between the first component and the second component, the coupling region comprising a noise-inducing region; and
a cover arranged to fully enclose the noise-inducing region in an adjacent manner to inhibit an airflow negotiating the noise-inducing region when the landing gear is in use, the cover comprising a flexible material arranged to permit the movement of the first component relative to the second component, the cover being in contact with the coupling region all of the way around the side walls and all of the way along the side walls so as to extend all of the way around the coupling region and all of the way along the coupling region;
wherein the cover encloses no more than one pin joint.

2. The aircraft landing gear according to claim 1, wherein the cover is arranged to prevent the airflow passing through it.

3. The aircraft landing gear according to claim 1, wherein the cover includes a coupling portion arranged for attachment to one or more components of the landing gear to maintain the cover in position.

4. The aircraft landing gear according to claim 3, wherein at least half of the coupling portion is adjacent to the one or more components.

5. The aircraft landing gear according to claim 1, wherein the cover comprises at least part of a sleeve.

6. The aircraft landing gear according to claim 1, wherein the cover comprises at least part of elongate strip of material wound around the noise-inducing region.

7. The aircraft landing gear according to claim 1, wherein the cover is arranged to resiliently grip the one or more side walls.

8. The aircraft landing gear according to claim 1, wherein the noise-inducing region of the coupling region has one or more outer peripheral surfaces and one or more inwardly extending surfaces or cavities, and the cover is adjacent or in contact with the outer peripheral surfaces of the coupling region so as to provide a low profile cover that conforms to the coupling region.

9. A method of reducing noise created by an aircraft landing gear in use, the method comprising the steps of:
providing an aircraft landing gear including a noise-inducing region wherein the landing gear includes a first component movably coupled to a second component via a coupling region, the coupling region comprising the noise-inducing region; and
fully enclosing and contacting a periphery of the noise-inducing region all of the way around and all of the way along the noise-inducing region in an adjacent manner with a cover to inhibit an airflow negotiating the noise-inducing region when the landing gear is in use, wherein the cover comprises a flexible material arranged to permit the movement of the first component relative to the second component, and wherein the cover encloses no more than one pin joint.

10. The method according to claim 9, wherein the step of fully enclosing comprises sliding a sleeve over the noise-inducing region to form the cover.

11. The method according to claim 9, wherein the step of fully enclosing comprises winding a wrap around the noise-inducing region to form the cover.

12. An aircraft landing gear including:
a first component;
a second component;
a joint movably coupling the first component to the second component, the joint comprising a noise-inducing region; and
a cover comprising a cover portion arranged to fully enclose the noise-inducing region in an adjacent manner to inhibit an airflow negotiating the noise-inducing region when the landing gear is in use;
wherein:
the cover portion comprises a flexible material arranged to permit the movement of the first component relative to the second component;
the cover is in contact with one or more outer surfaces of the joint all of the way around and all of the way along the joint; and
the cover portion encloses no more than one pin joint.

13. An aircraft landing gear including:
a first component;
a second component;
a pin joint movably coupling the first component to the second component, the pin joint comprising a noise-inducing region; and
a cover arranged to fully enclose the noise-inducing region in an adjacent manner to inhibit an airflow negotiating the noise-inducing region when the landing gear is in use;
wherein:
   the cover comprises a flexible material arranged to permit the movement of the first component relative to the second component; and
   wherein the cover encloses no more than one pin joint.

* * * * *